(12) United States Patent
Yang et al.

(10) Patent No.: US 12,469,627 B2
(45) Date of Patent: Nov. 11, 2025

(54) CONTROL CIRCUIT AND CONTROL METHOD OF BISTABLE PERMANENT MAGNET MECHANISM

(71) Applicant: Schneider Electric (China) Co., Ltd., Beijing (CN)

(72) Inventors: Qing Yang, Shanghai (CN); Xiaoqiang Li, Shanghai (CN); Baoyun Bi, Shanghai (CN); Yuchun Guo, Shanghai (CN); Zuoren Wu, Shanghai (CN); Xiaohang Chen, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 74 days.

(21) Appl. No.: 18/522,496

(22) Filed: Nov. 29, 2023

(65) Prior Publication Data
US 2025/0087398 A1    Mar. 13, 2025

(30) Foreign Application Priority Data
Sep. 8, 2023  (CN) .......................... 202311160056.9

(51) Int. Cl.
*H01H 47/00* (2006.01)
*H01F 7/02* (2006.01)
*H01F 7/06* (2006.01)

(52) U.S. Cl.
CPC ............... *H01F 7/064* (2013.01); *H01F 7/02* (2013.01)

(58) Field of Classification Search
CPC ....................................... H01F 7/064
See application file for complete search history.

(56) References Cited

U.S. PATENT DOCUMENTS

| | | | | |
|---|---|---|---|---|
| 4,343,275 A | * | 8/1982 | Brinkman | F02M 69/045 123/504 |
| 2018/0017179 A1 | * | 1/2018 | Robertson | F16K 31/0655 |
| 2022/0263398 A1 | * | 8/2022 | Yamamoto | H02K 41/031 |

* cited by examiner

*Primary Examiner* — Stephen W Jackson
(74) *Attorney, Agent, or Firm* — Patterson + Sheridan, LLP

(57) ABSTRACT

The present disclosure provides a control circuit and a control method of a bistable permanent magnet mechanism. The control circuit includes five switches, a diode and a control unit for controlling the five switches to be turned on and turned off. The control circuit enables the positive and the negative of the current passing through the coil to be adjustable at any time and avoids load breaking, without a complicated design of a driving circuit, thereby reducing the cost. It can also realize PWM control, adapt to a larger current range and different bistable permanent magnet mechanisms, and has a wide range of application scenarios.

10 Claims, 6 Drawing Sheets

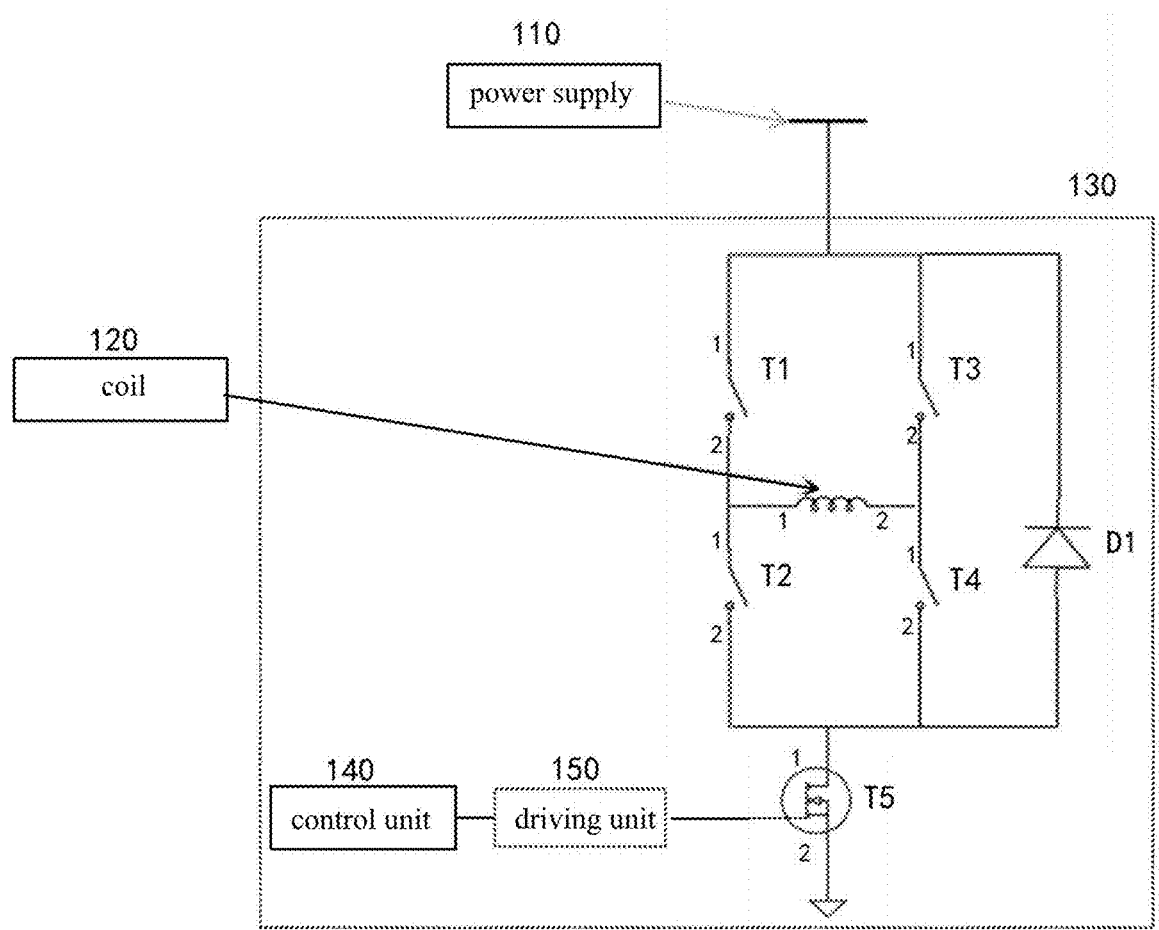

| controlling, by the control unit, the first switch, the fourth switch and the fifth switch to be turned on and the third switch and the second switch to be turned off in order to provide a positive current to the coil, and when it is needed to stop providing the positive current to the coil, controlling the fifth switch to be turned off and then controlling the first switch and the fourth switch to be turned off, by the control unit | S210 |

↓

| controlling, by the control unit, the third switch, the second switch and the fifth switch to be turned on and the first switch and the fourth switch to be turned off in order to provide a reverse current to the coil, and when it is needed to stop providing the reverse current to the coil, controlling the fifth switch to be turned off and then controlling the third switch and the second switch to be turned off, by the control unit | S220 |

FIG.2

CONTROL CIRCUIT AND CONTROL METHOD OF BISTABLE PERMANENT MAGNET MECHANISM

CROSS-REFERENCE TO RELATED APPLICATIONS

This application claims the benefit of priority of China Application No. CN202311160056.9 filed Sep. 8, 2023 the content of which is incorporated by reference herein in its entirety.

TECHNICAL FIELD

The present disclosure relates to a control field, more specifically, to a control circuit and a control method of a bistable permanent magnet mechanism.

BACKGROUND

A bistable permanent magnet mechanism is an operating mechanism that is electromagnetically driven and held by permanent magnets rather than electrically held. For the bistable permanent magnet mechanism, when a coil is energized, the coil through which the current flows generates a magnetic field that allows a movable iron core to move rapidly from, for example, position A to position B (i.e., a closing operation), and after reaching position B, the coil does not need to be continuously power supplied, and the magnetic field force generated by the permanent magnets keeps the movable iron core in position B. If it is expected to return the movable iron core from, for example, position B to position A (i.e., an opening operation), it is necessary to make a reverse current pass through the coil, which generates a reverse magnetic field, thus allowing the movable iron core to return from position B to position A.

Therefore, a control circuit is needed to make the positive and negative of the current passing through the coil adjustable at any time.

SUMMARY

With respect to the above problem, the present disclosure provides a control circuit of a bistable permanent magnet mechanism. Since the control circuit provided by the present disclosure can provide a positive current or a reverse current to the coil by simple operations of several switches and a diode, and make one switch to be turned off at first and then make the remaining switches to be turned off when stopping to provide the positive current or the reverse current to the coil, the control circuit provided by the present disclosure enables the positive and the negative of the current passing through the coil to be adjustable at any time and avoids load breaking, without a complex design of a driving circuit, thereby reducing the cost.

Embodiments of the present disclosure provide a control circuit of a bistable permanent magnet mechanism, wherein the bistable permanent magnet mechanism comprises a coil, and the control circuit comprises: a first switch, a second switch, a third switch, a fourth switch, a fifth switch, and a diode, wherein a first end of the first switch, a first end of the third switch, and a negative electrode of the diode are connected with a power supply, a second end of the first switch is connected with a first end of the coil, a second end of the third switch is connected with a second end of the coil, a first end of the second switch is connected with the first end of the coil, a first end of the fourth switch is connected with the second end of the coil, a second end of the second switch, a second end of the fourth switch and a positive electrode of the diode are connected with a first end of the fifth switch, and a second end of the fifth switch is grounded; a control unit for controlling turn-on and turn-off of the first switch, the second switch, the third switch, the fourth switch, the fifth switch, wherein, the control unit controls the first switch, the fourth switch and the fifth switch to be turned on and the third switch and the second switch to be turned off in order to provide a positive current to the coil, and when it is needed to stop providing the positive current to the coil, the control unit controls the fifth switch to be turned off and then controls the first switch and the fourth switch to be turned off; the control unit controls the third switch, the second switch and the fifth switch to be turned on and the first switch and the fourth switch to be turned off in order to provide a reverse current to the coil, and when it is needed to stop providing the reverse current to the coil, the control unit controls the fifth switch to be turned off and then controls the third switch and the second switch to be turned off.

According to an embodiment of the present disclosure, wherein the control unit is further used for controlling the fifth switch to operate based on a pulse width modulation wave.

According to an embodiment of the present disclosure, wherein the fifth switch is an electronic switch and a control end of the electronic switch is connected with the control unit.

According to an embodiment of the present disclosure, wherein the first switch, the second switch, the third switch and the fourth switch are mechanical switches.

According to an embodiment of the present disclosure, wherein the fifth switch is a mechanical switch.

Embodiments of the present disclosure provide a control method for a control circuit of a bistable permanent magnet mechanism, wherein the bistable permanent magnet mechanism comprises a coil, and the control circuit comprises: a first switch, a second switch, a third switch, a fourth switch, a fifth switch, and a diode, wherein a first end of the first switch, a first end of the third switch, and a negative electrode of the diode are connected with a power supply, a second end of the first switch is connected with a first end of the coil, a second end of the third switch is connected with a second end of the coil, a first end of the second switch is connected with the first end of the coil, a first end of the fourth switch is connected with the second end of the coil, a second end of the second switch, a second end of the fourth switch and a positive electrode of the diode are connected with a first end of the fifth switch, and a second end of the fifth switch is grounded; a control unit for controlling turn-on and turn-off of the first switch, the second switch, the third switch, the fourth switch, the fifth switch; the control method comprises: controlling, by the control unit, the first switch, the fourth switch and the fifth switch to be turned on and the third switch and the second switch to be turned off in order to provide a positive current to the coil, and when it is needed to stop providing the positive current to the coil, controlling the fifth switch to be turned off and then controlling the first switch and the fourth switch to be turned off, by the control unit; controlling, by the control unit, the third switch, the second switch and the fifth switch to be turned on and the first switch and the fourth switch to be turned off in order to provide a reverse current to the coil, and when it is needed to stop providing the reverse current to the coil, controlling the fifth switch to be turned off and then controlling the third switch and the second switch to be turned off, by the control unit.

According to an embodiment of the present disclosure, wherein the control unit is further used for controlling the fifth switch to operate based on a pulse width modulation wave; wherein the control method further comprises controlling the fifth switch to operate based on the pulse width modulation wave by the control unit.

According to an embodiment of the present disclosure, wherein the fifth switch is an electronic switch and a control end of the electronic switch is connected with the control unit.

According to an embodiment of the present disclosure, wherein the first switch, the second switch, the third switch and the fourth switch are mechanical switches.

According to an embodiment of the present disclosure, wherein the fifth switch is a mechanical switch.

The present disclosure provides a control circuit and a control method of a bistable permanent magnet mechanism. The control circuit provided by the present disclosure can provide a positive current or a reverse current to the coil by simple operations of several switches and a diode, and make one switch to be turned off at first and then make the remaining switches to be turned off when stopping to provide the positive current or the reverse current to the coil, so that the control circuit provided by the present disclosure enables the positive and the negative of the current passing through the coil to be adjustable at any time and avoids load breaking, without a complex design of a driving circuit, thereby reducing the cost. In addition, the control circuit of the present disclosure can control the fifth switch to operate based on a pulse width modulation wave, so that the control circuit provided by the present disclosure can realize PWM control, thus it can adapt to a larger working current range, and further it can adapt to different bistable permanent magnet mechanisms, and has a wide range of application scenarios.

BRIEF DESCRIPTION OF DRAWINGS

In order to more clearly illustrate technical solutions of embodiments of the present disclosure, accompanying drawings to be used in the description of the embodiments will be briefly described below. Obviously, the accompanying drawings in the following description are only some exemplary embodiments of the present disclosure, and for a person of ordinary skill in the art, other accompanying drawings can be obtained based on these drawings without creative labor.

FIG. 1F illustrates a schematic diagram of the control circuit 130 in the case where the fifth switch is an electronic switch, according to an embodiment of the present disclosure;

FIG. 2 illustrates a flowchart of a control method 200 for a control circuit of the bistable permanent magnet mechanism according to an embodiment of the present disclosure.

DETAILED DESCRIPTION

Figure 1A:
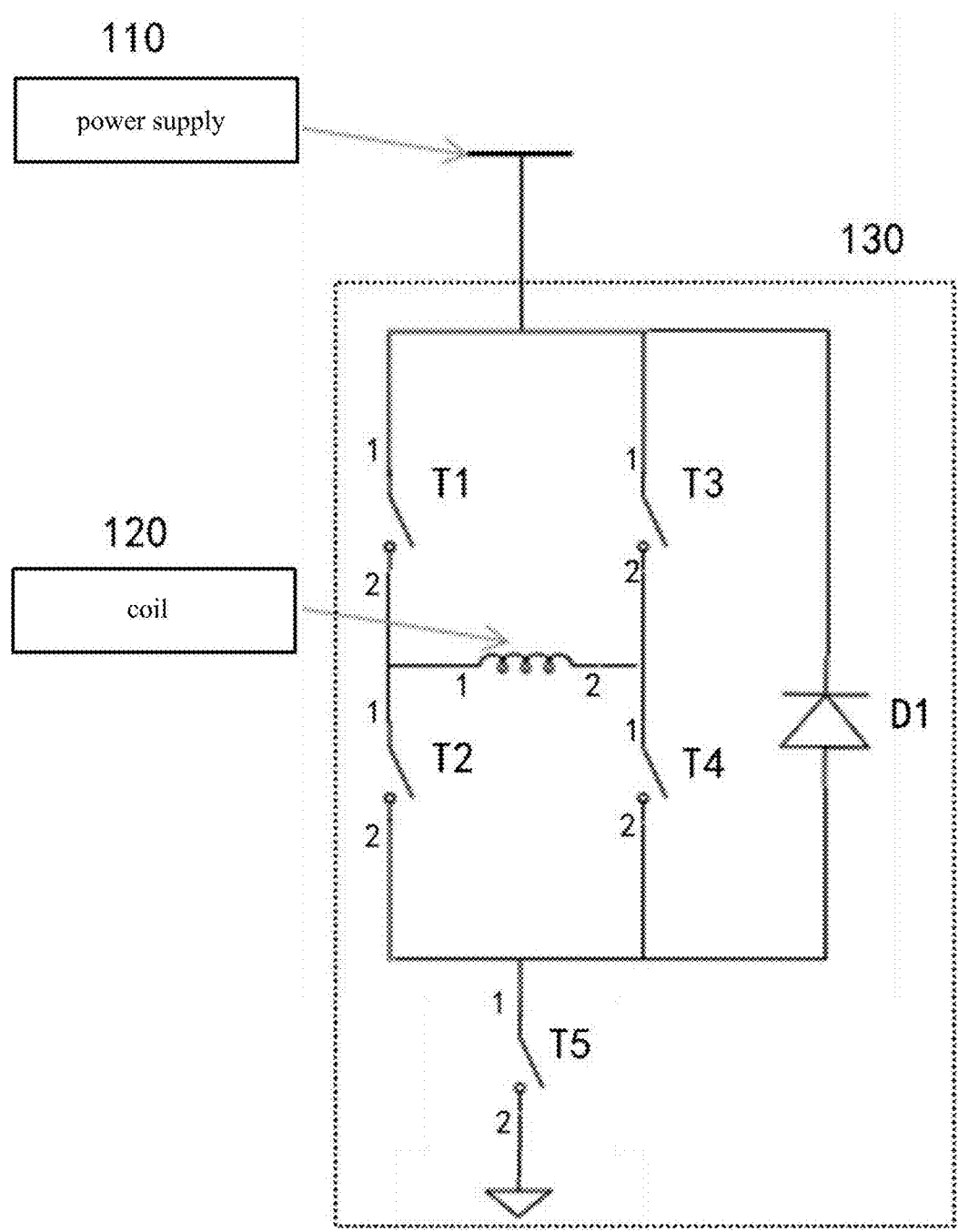
FIG. 1A illustrates a schematic diagram of a control circuit 130 of a bistable permanent magnet mechanism according to an embodiment of the present disclosure.

In order to make the objects, technical solutions and advantages of the embodiments of the present disclosure clearer, the technical solutions of the embodiments of the present disclosure will be described clearly and completely below in conjunction with the accompanying drawings of the embodiments of the present disclosure. Obviously, the described embodiments are a part of the embodiments of the present disclosure, and not all of the embodiments. Based on the described embodiments of the present disclosure, all other embodiments obtained by a person of ordinary skill in the art without the need for creative labor fall within the protection scope of the present disclosure.

Unless otherwise defined, technical terms or scientific terms used in this disclosure shall have the ordinary meaning understood by a person of ordinary skill in the art to which this disclosure pertains. The terms "first," "second," and the like, as used in this disclosure, do not indicate any order, quantity, or importance, but are used only to distinguish between different components. Similarly, words such as "a," "one," or "the" and similar words do not indicate a limitation in number, but rather the presence of at least one. Similar words such as "comprise" or "include" mean that an element or an object appearing before the word encompasses elements or objects listed after the word and their equivalents and does not exclude other elements or objects. Words such as "connected" or "connected with" are not limited to a physical or mechanical connection, but may include an electrical connection, whether direct or indirect. The words "up", "down", "left", "right", etc. are used only to indicate a relative positional relationship. When an absolute position of the described object is changed, the relative positional relationship may be changed accordingly.

In the prior art, a control circuit is needed to make the positive and negative of the current passing through a coil adjustable at any time. At present, there are two main implementation methods. One implementation method is to form a bridge circuit by four metal-oxide-semiconductor field-effect transistors (MOSFET), so as to realize the control for the positive and negative directions of the current passing through the coil. However, this method is not only complicated in circuit, but also difficult to realize Pulse Width Modulation (PWM) control. Another implementation method is to realize the control for the positive and negative directions of the current passing through the coil by a bidirectional switching circuit composed of two relays. However, this method is also more complicated in the circuit, and at the same time, still needs the relay to realize load breaking, which requires higher contact silver thickness of the relay and increases the cost. In addition, because of a slow action speed of the relay, it is also impossible to realize the PWM control.

In order to solve the above problems, the present disclosure provides a control circuit of a bistable permanent magnet mechanism. Since the control circuit provided by the present disclosure can provide a positive current or a reverse current to the coil by simple operations of several switches and a diode, and make one switch to be turned off at first and then make the remaining switches to be turned off when stopping to provide the positive current or the reverse current to the coil, the control circuit provided by the present disclosure enables the positive and the negative of the current passing through the coil to be adjustable at any time and avoids load breaking, without a complex design of a driving circuit, thereby reducing the cost.

The above control circuit provided by the present disclosure will be described in detail below with reference to the drawings.

FIG. 1A illustrates a schematic diagram of a control circuit 130 of a bistable permanent magnet mechanism according to an embodiment of the present disclosure.

Referring to FIG. 1A, the control circuit 130 may include a first switch T1, a second switch T2, a third switch T3, a fourth switch T4, a fifth switch T5 and a diode D1.

According to the embodiment of the present disclosure, a first end 1 of the first switch T1, a first end 1 of the third switch T3 and a negative electrode of the diode D1 may all be connected with a power supply 110, wherein the power supply 110 may be any suitable external power supply, such as a DC power supply or a rectified DC power supply. A second end 2 of the first switch T1 may be connected with a first end 1 of a coil 120, wherein the coil 120 may be the coil of the bistable permanent magnet mechanism as mentioned above. A second end 2 of the third switch T3 may be connected with a second end 2 of the coil 120. A first end 1 of the second switch T2 may be connected with the first end 1 of the coil 120. A first end 1 of the fourth switch T4 may be connected with the second end 2 of the coil 120. A second end 2 of the second switch T2, a second end 2 of the fourth switch T4 and a positive electrode of the diode D1 may be connected with a first end 1 of the fifth switch T5. A second end 2 of the fifth switch T5 may be grounded.

According to the embodiment of the present disclosure, the first switch T1, the second switch T2, the third switch T3, the fourth switch T4 and the fifth switch T5 may be the same or different types of mechanical switches selected according to actual needs, such as double-pole double-throw switches or single-pole single-throw switches.

According to an embodiment of the present disclosure, the control circuit 130 may include a control unit for controlling turn-on and turn-off of the first switch T1, the second switch T2, the third switch T3, the fourth switch T4 and the fifth switch T5.

As an example, the control unit may control the first switch T1, the fourth switch T4 and the fifth switch T5 to be turned on and the third switch T3 and the second switch T2 to be turned off in order to provide a positive current to the coil. For example, the control unit may first control the first switch T1 and the fourth switch T4 to be turned on, and the third switch T3 and the second switch T2 to be turned off, and then control the fifth switch T5 to be turned on. It should be noted that the turn-on sequence of the above switches is only an example, and the above switches may be turned on in other sequences or at the same time.

Figure 1B:
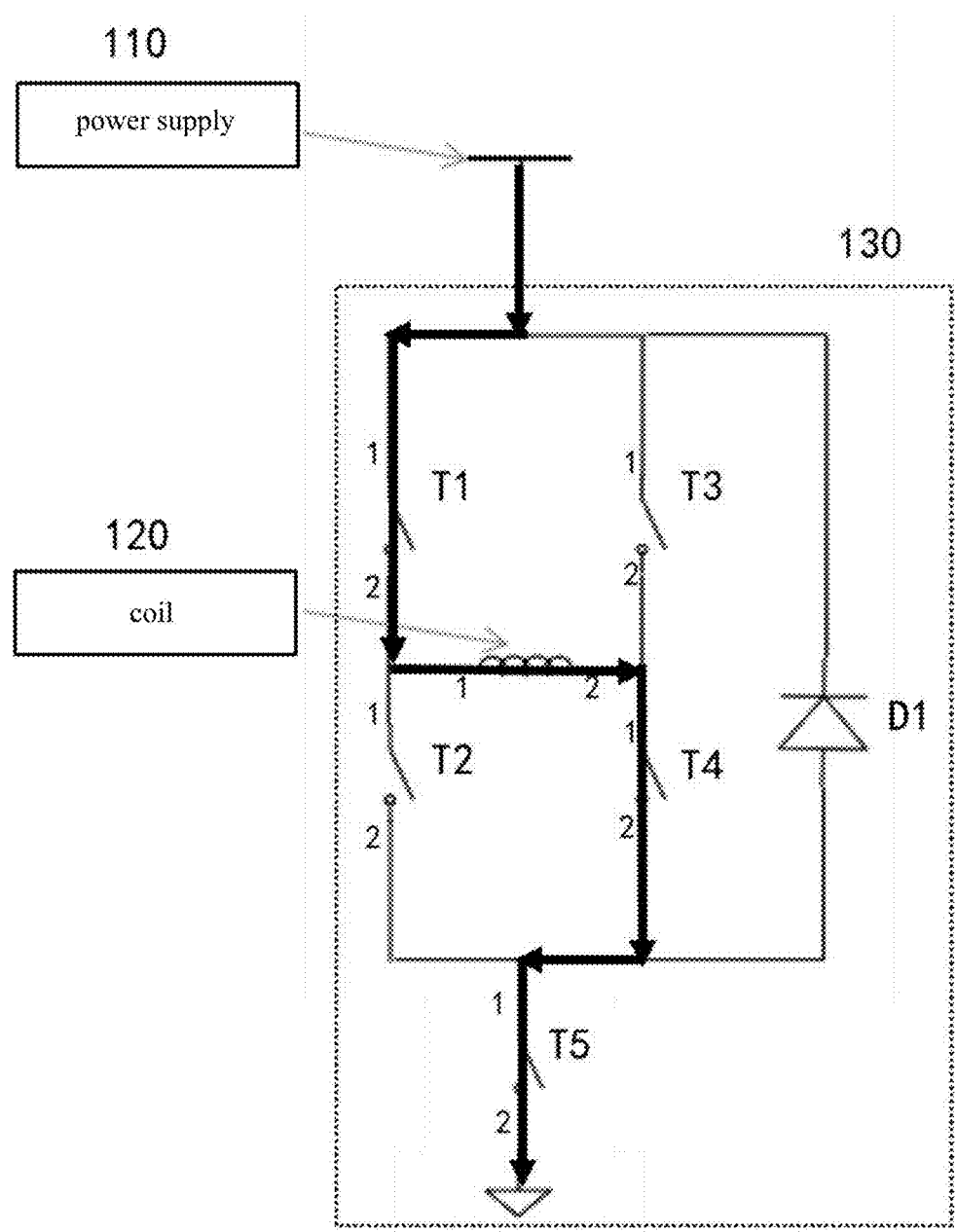
FIG. 1B illustrates a schematic diagram of the control circuit 130 providing a positive current, according to an embodiment of the present disclosure.

At this time, as shown in FIG. 1B, the power supply 110, the first switch T1, the coil 120, the fourth switch T4, and the fifth switch T5 form a loop (as shown by a black bold arrow in FIG. 1B), thereby providing, for example, a positive current to the coil 120. In this case, as introduced before, the coil through which the positive current is passed can generate a magnetic field, so that a movable iron core is moved quickly from position A to position B, thereby realizing a closing operation.

Figure 1C:
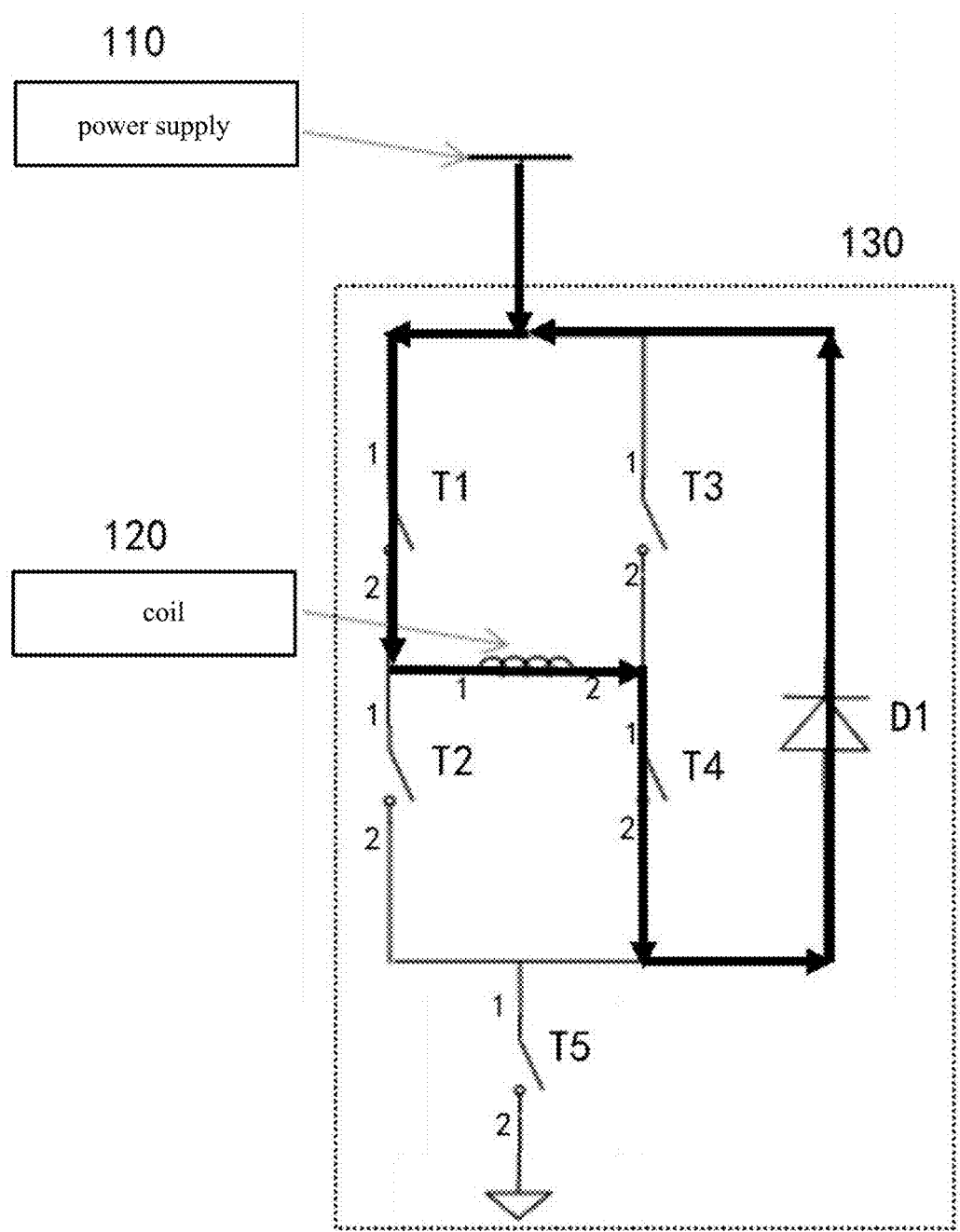
FIG. 1C illustrates a schematic diagram of a loop after a fifth switch is turned off according to an embodiment of the present disclosure.

When it is needed to stop providing the positive current to the coil 120, the control unit may control the fifth switch T5 to be turned off and then control the first switch T1 and the fourth switch T4 to be turned off. For example, as shown in FIG. 1C, the control unit may first control the fifth switch T5 to be turned off, and then control the first switch T1 and the fourth switch T4 to be turned off after a predetermined time interval (which may be a predetermined value determined in advance, such as N nanoseconds, where N is a positive integer) or after detecting that there is no current in a loop (as shown by a black bold arrow in FIG. 1C) formed by the first switch T1, the coil 120, the fourth switch T4 and the diode D1. As an example, it may be detected by any suitable existing way whether there is still a current in the above loop.

Since the first switch T1 and the fourth switch T4 are not turned off immediately after the fifth switch T5 is turned off, the current flowing through the first switch T1, the coil 120, the fourth switch T4 and the diode D1 may be consumed through the loop formed by the first switch T1, the coil 120, the fourth switch T4 and the diode D1 after the fifth switch T5 is turned off. After the current is consumed, the control unit controls the first switch T1 and the fourth switch T4 to be turned off, thus a load breaking problem of the first switch T1 and the fourth switch T4 can be avoided. In addition, after the current is consumed, there is no current passing through the coil. At this time, as introduced in the background, the movable iron core may be kept at the position B by magnetic field force generated by a permanent magnet.

As an example, the control unit may control the third switch T3, the second switch T2 and the fifth switch T5 to be turned on and the first switch T1 and the fourth switch T4 to be turned off in order to provide a reverse current to the coil. For example, the control unit may first control the third switch T3 and the second switch T2 to be turned on, the first switch T1 and the fourth switch T4 to be turned off, and then control the fifth switch T5 to be turned on. It should be noted that the turn-on sequence of the above switches is only an example, and the above switches may be turned on in other sequences or at the same time.

Figure 1D:
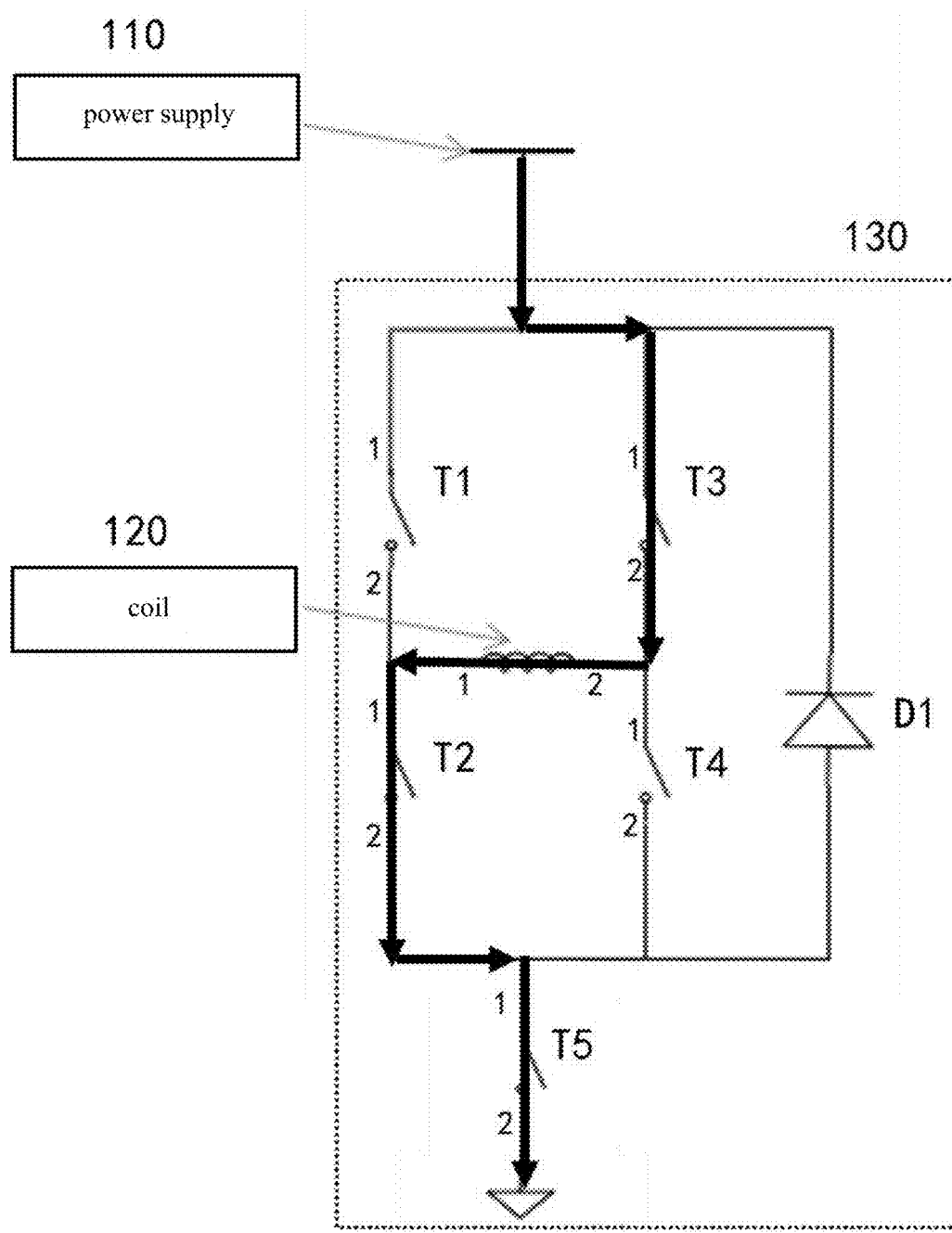
FIG. 1D illustrates a schematic diagram of the control circuit 130 for providing a reverse current according to an embodiment of the present disclosure.

At this time, as shown in FIG. 1D, the power supply, the third switch T3, the coil 120, the second switch T2 and the fifth switch T5 form a loop (as shown by a black bold arrow in FIG. 1D), thereby providing, for example, a reverse current to the coil 120. In this case, as introduced before, the coil through which the reverse current is passed can generate a magnetic field, so that the movable iron core is quickly restored from position B to position A, thereby realizing an opening operation.

Figure 1E:
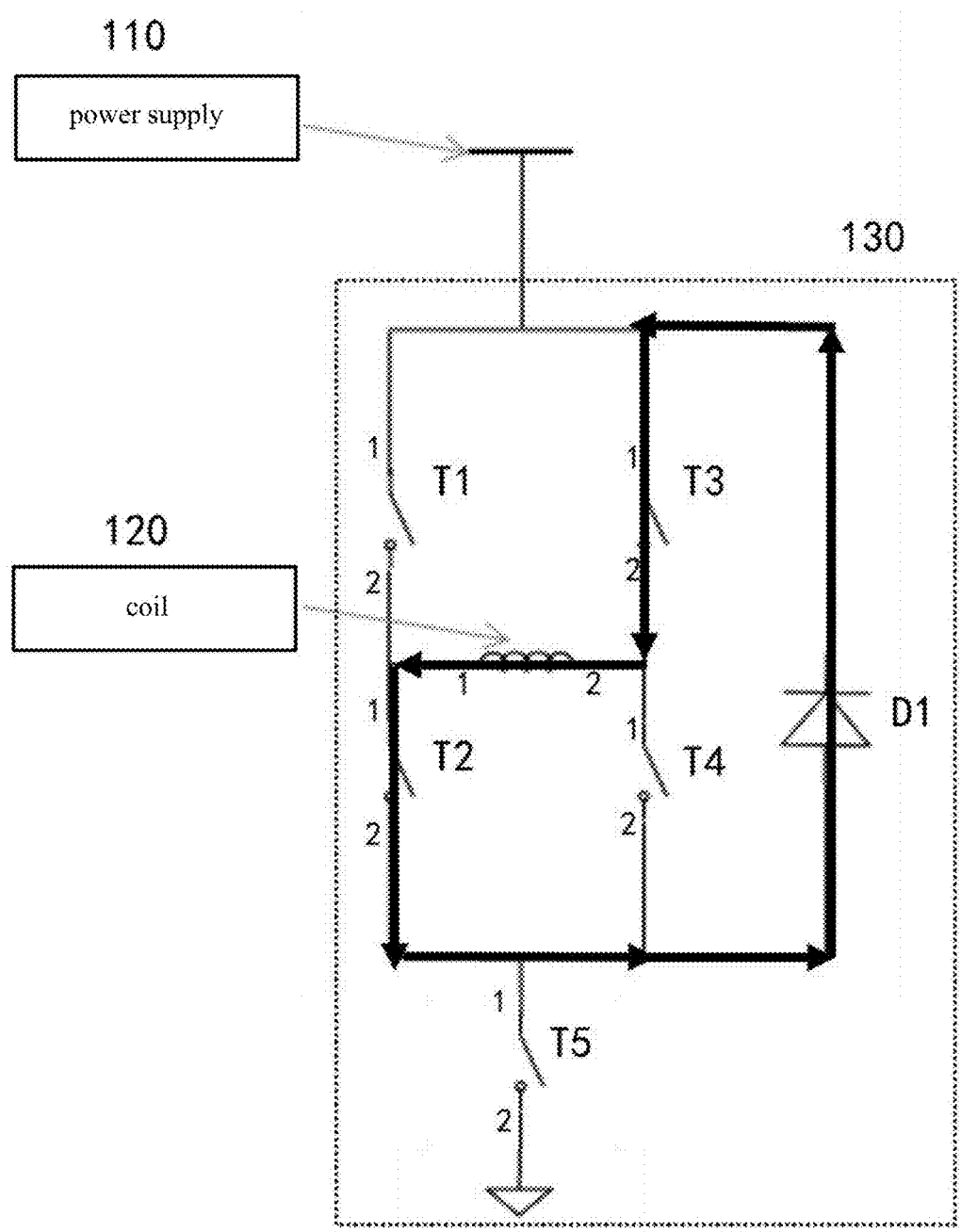
FIG. 1E illustrates a schematic diagram of a loop after the fifth switch is turned off according to an embodiment of the present disclosure.

When it is needed to stop providing the reverse current to the coil 120, the control unit controls the fifth switch T5 to be turned off and then controls the third switch T3 and the second switch T2 to be turned off. For example, as shown in FIG. 1D, the control unit can first control the fifth switch T5 to be turned off, and then control the third switch T3 and the second switch T2 to be turned off after a predetermined time interval (which may be a predetermined value determined in advance, such as M nanoseconds, where M is a positive integer, and the value of M may be the same or different from the value of N mentioned above according to the actual situation) or after detecting that there is no current in a loop (as shown by the black bold arrow in FIG. 1E) formed by the third switch T3, the coil 120, the second switch T2 and the diode D1. As an example, it may be detected by any suitable existing way whether there is still a current in the above loop.

Since the third switch T3 and the second switch T2 are not turned off immediately after the fifth switch T5 is turned off, the current flowing through the third switch T3, the coil 120, the second switch T2 and the diode D1 may be consumed through the loop formed by the third switch T3, the coil 120, the second switch T2 and the diode D1 after the fifth switch T5 is turned off. After the current is consumed, the control unit controls the third switch T3 and the second switch T2 to be turned off, thus the load breaking problem of the third switch T3 and the second switch T2 can be avoided. In addition, after the current is consumed, there is no current passing through the coil. At this time, as introduced in the background, the movable iron core may be kept in the position A by the magnetic field force generated by the permanent magnet.

According to the embodiment of the present disclosure, the control unit may also be used for controlling the fifth switch T5 to operate based on the pulse width modulation wave. For example, at this time, the fifth switch T5 may be an electronic switch, for example, the electronic switch based on a thyristor (such as a Silicon Controlled Rectifier (SCR)), a MOSFET, an Insulated Gate Bipolar Transistor, and the like. The control end of the electronic switch may be connected with the control unit.

As an example, in the case that the fifth switch T5 is an electronic switch implemented based on the MOSFET, the schematic diagram of the control circuit 130 may be as shown in FIG. 1F.

As shown in FIG. 1F, a first end 1 of the fifth switch T5 may be a drain of the MOSFET, and the second end 2 of the fifth switch T5 may be a source of the MOSFET, and the gate (i.e., the control end) of the MOSFET may be connected with the control unit 140. A driving unit 150 shown in a dotted line in FIG. 1F may be used to drive, based on the PWM wave output by the control unit 140, the fifth switch T5 to operate based on the PWM wave. The driving unit 150 is an optional unit and may be integrated in the control unit 140. In addition, for simplicity, only the control unit 140 is shown in FIG. 1F to be connected with the fifth switch T5, so as to control the fifth switch T5; However, as described above, the control unit 150 may be connected with the first switch T1, the second switch T2, the third switch T3 and the fourth switch T4 respectively, so that the control unit 150 may control the turn-on and the turn-off of the first switch T1, the second switch T2, the third switch T3 and the fourth switch T4.

A PWM wave with a predetermined duty ratio may be output by the control unit 140, so that a loop formed by the fifth switch T5, which operates based on the PWM wave with the predetermined duty ratio, and the above switches and coil, has a current size corresponding to the PWM wave, so that the control circuit provided by the present disclosure can adapt to different bistable permanent magnet mechanisms. For example, when the coil in the bistable permanent magnet mechanism needs a current of 1 A, the control unit 140 may output a PWM wave with a duty ratio corresponding to the current of 1 A, so that after the control unit 140 outputs the PWM wave with this duty ratio, the loop formed by the fifth switch T5 operating based on the PWM wave with the duty ratio and the above switches and coil has a current size of 1 A. For another example, when the coil in the bistable permanent magnet mechanism needs a current of 5 A, the control unit 140 may output a PWM wave with a duty ratio corresponding to the current of 5 A, so that after the control unit 140 outputs the PWM wave with this duty ratio, the loop formed by the fifth switch T5 operating based on the PWM wave with the duty ratio and the above switches and coil has a current size of 5 A.

From the above, it can be seen that the control circuit provided by the present disclosure can realize PWM control, thus it can adapt to a larger working current range, and further it can adapt to different bistable permanent magnet mechanisms, and has a wide range of application scenarios.

In addition, as shown in FIG. 1F, the control unit 140 may also output a wave with a constant level. At this time, the fifth switch T5 may be turned on or turned off, which is similar to the case that the fifth switch is a mechanical switch, and will not be described here.

The control circuit of the bistable permanent magnet mechanism according to embodiments of the present disclosure has been described above with reference to FIG. 1A to FIG. 1F. According to the control circuit of embodiments of the present disclosure, a positive current or a reverse current may be provided to the coil through simple operations of several switches and a diode, and when the positive current or the reverse current is stopped to be provided to the coil, one switch is turned off first, and then the remaining switches are turned off, so that the control circuit provided by the present disclosure enables the positive and the negative of the current passing through the coil to be adjustable at any time and avoids load breaking, without a complex design of a driving circuit, thereby reducing the cost. In addition, the control circuit of the present disclosure can control the fifth switch to operate based on the pulse width modulation wave, so that the control circuit provided by the present disclosure can realize the PWM control, thus it can adapt to a larger working current range, and further it can adapt to different bistable permanent magnet mechanisms, and has a wide range of application scenarios.

In addition to providing the control circuit of the bistable permanent magnet mechanism described above, the present disclosure also provides a control method for the control circuit of the bistable permanent magnet mechanism, which will be described with reference to FIG. 2.

FIG. 2 illustrates a flowchart of a control method 200 for a control circuit of the bistable permanent magnet mechanism according to an embodiment of the present disclosure. The above description of the control circuit of the bistable permanent magnet mechanism also applies to the method 200, unless otherwise explicitly stated.

According to an embodiment of the present disclosure, the bistable permanent magnet mechanism may comprise a coil, and the control circuit may comprise: a first switch, a second switch, a third switch, a fourth switch, a fifth switch, and a diode, wherein a first end of the first switch, a first end of the third switch, and a negative electrode of the diode are connected with a power supply, a second end of the first switch is connected with a first end of the coil, a second end of the third switch is connected with a second end of the coil, a first end of the second switch is connected with the first end of the coil, a first end of the fourth switch is connected with the second end of the coil, a second end of the second switch, a second end of the fourth switch and a positive electrode of the diode are connected with a first end of the fifth switch, and a second end of the fifth switch is grounded; a control unit for controlling on and off of the first switch, the second switch, the third switch, the fourth switch, the fifth switch.

As an example, as described above with reference to FIG. 1A, the control circuit 130 may include a first switch T1, a second switch T2, a third switch T3, a fourth switch T4, a fifth switch T5 and a diode D1. A first end 1 of the first switch T1, a first end 1 of the third switch T3 and a negative electrode of the diode D1 may all be connected with a power supply 110, wherein the power supply 110 may be any suitable external power supply, such as a DC power supply or a rectified DC power supply. A second end 2 of the first switch T1 may be connected with a first end 1 of a coil 120, wherein the coil 120 may be the coil of the bistable permanent magnet mechanism as mentioned above. A second end 2 of the third switch T3 may be connected with a second end 2 of the coil 120. A first end 1 of the second switch T2 may be connected with the first end 1 of the coil 120. A first end 1 of the fourth switch T4 may be connected with the second end 2 of the coil 120. A second end 2 of the second switch T2, a second end 2 of the fourth switch T4 and a positive electrode of the diode D1 may be connected with a first end 1 of the fifth switch T5. A second end 2 of the fifth switch T5 may be grounded.

According to the embodiment of the present disclosure, the first switch T1, the second switch T2, the third switch T3, the fourth switch T4 and the fifth switch T5 may be the same or different types of mechanical switches selected according to actual needs, such as double-pole double-throw switches or single-pole single-throw switches.

According to an embodiment of the present disclosure, the control circuit 130 may include a control unit for controlling turn-on and turn-off of the first switch T1, the second switch T2, the third switch T3, the fourth switch T4 and the fifth switch T5.

Referring to FIG. 2, in step S210, the first switch T1, the fourth switch T4 and the fifth switch T5 may be controlled to be turned on and the third switch T3 and the second switch T2 may be controlled to be turned off, by the control unit, in order to provide a positive current to the coil, and when it is needed to stop providing the positive current to the coil, the fifth switch is controlled to be turned off and then the first switch and the fourth switch are controlled to be turned off, by the control unit.

For example, the control unit may first control the first switch T1 and the fourth switch T4 to be turned on, and the third switch T3 and the second switch T2 to be turned off, and then control the fifth switch T5 to be turned on. It should be noted that the turn-on sequence of the above switches is only an example, and the above switches may be turned on in other sequences or at the same time. At this time, as shown in FIG. 1B, the power supply 110, the first switch T1, the coil 120, the fourth switch T4, and the fifth switch T5 form a loop (as shown by a black bold arrow in FIG. 1B), thereby providing, for example, a positive current to the coil 120. In this case, as introduced before, the coil through which the positive current is passed can generate a magnetic field, so that a movable iron core is moved quickly from position A to position B, thereby realizing a closing operation.

When it is needed to stop providing the positive current to the coil 120, the control unit may control the fifth switch T5 to be turned off and then control the first switch T1 and the fourth switch T4 to be turned off. For example, as shown in FIG. 1C, the control unit may first control the fifth switch T5 to be turned off, and then control the first switch T1 and the fourth switch T4 to be turned off after a predetermined time interval (which may be a predetermined value determined in advance, such as N nanoseconds, where N is a positive integer) or after detecting that there is no current in a loop (as shown by a black bold arrow in FIG. 1C) formed by the first switch T1, the coil 120, the fourth switch T4 and the diode D1. As an example, it may be detected by any suitable existing way whether there is still a current in the above loop.

Since the first switch T1 and the fourth switch T4 are not turned off immediately after the fifth switch T5 is turned off, the current flowing through the first switch T1, the coil 120, the fourth switch T4 and the diode D1 may be consumed through the loop formed by the first switch T1, the coil 120, the fourth switch T4 and the diode D1 after the fifth switch T5 is turned off. After the current is consumed, the control unit controls the first switch T1 and the fourth switch T4 to be turned off, thus a load breaking problem of the first switch T1 and the fourth switch T4 can be avoided. In addition, after the current is consumed, there is no current passing through the coil. At this time, as introduced in the background, the movable iron core may be kept at the position B by magnetic field force generated by a permanent magnet.

With continued reference to FIG. 2, in step S220, the third switch T3, the second switch T2 and the fifth switch T5 may be controlled to be turned on and the first switch T1 and the fourth switch T4 may be controlled to be turned off, by the control unit, in order to provide a reverse current to the coil, and when it is needed to stop providing the reverse current to the coil, the fifth switch is controlled to be turned off and then the third switch and the second switch is controlled to be turned off, by the control unit.

For example, the control unit may first control the third switch T3 and the second switch T2 to be turned on, the first switch T1 and the fourth switch T4 to be turned off, and then control the fifth switch T5 to be turned on. It should be noted that the turn-on sequence of the above switches is only an example, and the above switches may be turned on in other sequences or at the same time.

At this time, as shown in FIG. 1D, the power supply, the third switch T3, the coil 120, the second switch T2 and the fifth switch T5 form a loop (as shown by a black bold arrow in FIG. 1D), thus providing, for example, a reverse current to the coil 120. In this case, as introduced before, the coil through which the reverse current is passed can generate a magnetic field, so that the movable iron core is quickly restored from position B to position A, thereby realizing an opening operation.

When it is needed to stop providing the reverse current to the coil 120, the control unit controls the fifth switch T5 to be turned off and then controls the third switch T3 and the second switch T2 to be turned off. For example, as shown in FIG. 1D, the control unit can first control the fifth switch T5 to be turned off, and then control the third switch T3 and the second switch T2 to be turned off after a predetermined time interval (which may be a predetermined value determined in advance, such as M nanoseconds, where M is a positive integer, and the value of M may be the same or different from the value of N mentioned above according to the actual situation) or after detecting that there is no current in a loop (as shown by the black bold arrow in FIG. 1E) formed by the third switch T3, the coil 120, the second switch T2 and the diode D1. As an example, it may be detected by any suitable existing way whether there is still a current in the above loop.

Since the third switch T3 and the second switch T2 are not turned off immediately after the fifth switch T5 is turned off, the current flowing through the third switch T3, the coil 120, the second switch T2 and the diode D1 may be consumed through the loop formed by the third switch T3, the coil 120, the second switch T2 and the diode D1 after the fifth switch T5 is turned off. After the current is consumed, the control unit controls the third switch T3 and the second switch T2 to be turned off, thus the load breaking problem of the third switch T3 and the second switch T2 can be avoided. In addition, after the current is consumed, there is no current passing through the coil. At this time, as introduced in the background, the movable iron core may be kept in the position A by the magnetic field force generated by the permanent magnet.

According to the embodiment of the present disclosure, the control unit may also be used for controlling the fifth switch T5 to operate based on the pulse width modulation wave. For example, at this time, the fifth switch T5 may be an electronic switch, for example, the electronic switch based on a thyristor (such as a Silicon Controlled Rectifier (SCR)), a MOSFET, an Insulated Gate Bipolar Transistor, and the like. The control end of the electronic switch may be connected with the control unit. In this case, the method 200 may further include controlling the fifth switch to operate based on a pulse width modulation wave by the control unit.

As an example, in the case that the fifth switch T5 is an electronic switch implemented based on the MOSFET, the schematic diagram of the control circuit 130 may be as shown in FIG. 1F.

As shown in FIG. 1F, a first end 1 of the fifth switch T5 may be a drain of the MOSFET, and the second end 2 of the fifth switch T5 may be a source of the MOSFET, and the gate (i.e., the control end) of the MOSFET may be connected with the control unit 140. A driving unit 150 shown in a dotted line in FIG. 1F may be used to drive, based on the PWM wave output by the control unit 140, the fifth switch T5 to operate based on the PWM wave. The driving unit 150 is an optional unit and may be integrated in the control unit 140. In addition, for simplicity, only the control unit 140 is shown in FIG. 1F to be connected with the fifth switch T5, so as to control the fifth switch T5; However, as described above, the control unit 150 may be connected with the first switch T1, the second switch T2, the third switch T3 and the fourth switch T4 respectively, so that the control unit 150 may control the turn-on and the turn-off of the first switch T1, the second switch T2, the third switch T3 and the fourth switch T4.

The method 200 may output a PWM wave with a predetermined duty ratio by the control unit 140, so that a loop formed by the fifth switch T5, which operates based on the PWM wave with the predetermined duty ratio, and the above switches and coil has a current size corresponding to the PWM wave, so that the control method provided by the present disclosure can adapt to different bistable permanent magnet mechanisms. For example, when the coil in the bistable permanent magnet mechanism needs a current of 1 A, the method 200 may output a PWM wave with a duty ratio corresponding to the current of 1 A by the control unit 140, so that after the control unit 140 outputs the PWM wave with this duty ratio, the loop formed by the fifth switch T5 operating based on the PWM wave with the duty ratio and the above switches and coil has a current size of 1 A. For another example, when the coil in the bistable permanent magnet mechanism needs a current of 5 A, the method 200 may output a PWM wave with a duty ratio corresponding to the current of 5 A by the control unit 140, so that after the control unit 140 outputs the PWM wave with this duty ratio, the loop formed by the fifth switch T5 operating based on the PWM wave with the duty ratio and the above switches and coil has a current size of 5 A.

From the above, it can be seen that the control circuit provided by the present disclosure can realize PWM control, thus it can adapt to a larger working current range, and further it can adapt to different bistable permanent magnet mechanisms, and has a wide range of application scenarios.

In addition, as shown in FIG. 1F, the method 200 may also output a wave with a constant level by the control unit 140. At this time, the fifth switch T5 may be turned on or turned off, which is similar to the case that the fifth switch is a mechanical switch, and will not be described here.

In addition, it should be noted that there is no necessary execution order of steps S210 and S220. Depending on the actual application scenario, it is possible that only one of the above steps S210 and S220 needs to be executed, and it is also possible that step S220 is executed first and then step S210 is executed, or step S210 is executed first and then step S220 is executed.

The control circuit and control method of the bistable permanent magnet mechanism according to embodiments of the present disclosure have been described above with reference to FIG. 1A to FIG. 2. According to the control circuit and the control method of embodiments of the present disclosure, a positive current or a reverse current may be provided to the coil through simple operations of several switches and a diode, and when the positive current or the reverse current is stopped to be provided to the coil, one switch is turned off first, and then the remaining switches are turned off, so that the control circuit provided by the present disclosure enables the positive and the negative of the current passing through the coil to be adjustable at any time and avoids load breaking, without a complex design of a driving circuit, thereby reducing the cost. In addition, the control circuit and the control method of the present disclosure can control the fifth switch to operate based on the pulse width modulation wave, so that the control circuit and the control method provided by the present disclosure can realize the PWM control, thus it can adapt to a larger working current range, and further it can adapt to different bistable permanent magnet mechanisms, and has a wide range of application scenarios.

It should be noted that the flowchart and block diagrams in the drawings illustrate the architecture, functions and operations of possible implementations of the control circuit and the control method according to various embodiments of the present disclosure. In this regard, each block in the flowchart or block diagrams may represent a module, a program segment, or a part of code that contains one or more executable instructions for implementing a specified logical function. It should also be noted that in some alternative implementations, the functions noted in the block may occur in a order different from the order noted in the drawings. For example, two blocks shown in succession may actually be executed substantially in parallel, and they may sometimes be executed in a reverse order, depending on the functions involved. It should also be noted that each block in the block diagrams and/or the flowchart, and combinations of blocks in the block diagrams and/or the flowchart, may be implemented by a dedicated hardware-based system that performs specified functions or operations, or by a combination of dedicated hardware and computer instructions.

In general, various example embodiments of the present disclosure may be implemented in hardware or dedicated circuits, software, firmware, logic, or any combination thereof. Some aspects may be implemented in hardware, while other aspects may be implemented in firmware or software that may be executed by a controller, a microprocessor or other computing devices. When aspects of embodiments of the present disclosure are illustrated or described as block diagrams, flowcharts, or represented using some other graphics, it will be understood that the blocks, devices, systems, techniques, or methods described herein may be implemented in hardware, software, firmware, special-purpose circuits or logics, general-purpose hardware or controllers or other computing devices, or some combination thereof, as non-limiting examples.

The exemplary embodiments of the present invention described in detail above are only illustrative and not restrictive. Those skilled in the art should understand that various modifications and combinations can be made to these embodiments or their features without departing from the principles and spirit of the present invention, and such modifications should fall within the scope of the present invention.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A control circuit of a bistable permanent magnet mechanism, wherein the bistable permanent magnet mechanism comprises a coil, and the control circuit comprises: a first switch, a second switch, a third switch, a fourth switch, a fifth switch, and a diode, wherein a first end of the first switch, a first end of the third switch, and a negative electrode of the diode are connected with a power supply, a second end of the first switch is connected with a first end of the coil, a second end of the third switch is connected with a second end of the coil, a first end of the second switch is connected with the first end of the coil, a first end of the fourth switch is connected with the second end of the coil, a second end of the second switch, a second end of the fourth switch and a positive electrode of the diode are connected with a first end of the fifth switch, and a second end of the fifth switch is grounded; a control unit for controlling turn-on and turn-off of the first switch, the second switch, the third switch, the fourth switch, the fifth switch, wherein, the control unit controls the first switch, the fourth switch and the fifth switch to be turned on and the third switch and the second switch to be turned off in order to provide a positive current to the coil, and when it is needed to stop providing the positive current to the coil, the control unit controls the fifth switch to be turned off and then controls the first switch and the fourth switch to be turned off; the control unit controls the third switch, the second switch and the fifth switch to be turned on and the first switch and the fourth switch to be turned off in order to provide a reverse current to the coil, and when it is needed to stop providing the reverse current to the coil, the control unit controls the fifth switch to be turned off and then controls the third switch and the second switch to be turned off.

Clause 2. The control circuit according to clause 1, wherein the control unit is further used for controlling the fifth switch to operate based on a pulse width modulation wave.

Clause 3. The control circuit according to clause 1 or clause 2, wherein the fifth switch is an electronic switch and a control end of the electronic switch is connected with the control unit.

Clause 4. The control circuit according to any one of clauses 1-3, wherein the first switch, the second switch, the third switch and the fourth switch are mechanical switches.

Clause 5. The control circuit according to clause 1, wherein the fifth switch is a mechanical switch.

Clause 6. A control method for a control circuit of a bistable permanent magnet mechanism, wherein the bistable permanent magnet mechanism comprises a coil, and the control circuit comprises: a first switch, a second switch, a third switch, a fourth switch, a fifth switch, and a diode, wherein a first end of the first switch, a first end of the third switch, and a negative electrode of the diode are connected with a power supply, a second end of the first switch is connected with a first end of the coil, a second end of the third switch is connected with a second end of the coil, a first end of the second switch is connected with the first end of the coil, a first end of the fourth switch is connected with the second end of the coil, a second end of the second switch, a second end of the fourth switch and a positive electrode of the diode are connected with a first end of the fifth switch, and a second end of the fifth switch is grounded; a control unit for controlling turn-on and turn-off of the first switch, the second switch, the third switch, the fourth switch, the fifth switch; the control method comprises: controlling, by the control unit, the first switch, the fourth switch and the fifth switch to be turned on and the third switch and the second switch to be turned off in order to provide a positive current to the coil, and when it is needed to stop providing the positive current to the coil, controlling the fifth switch to be turned off and then controlling the first switch and the fourth switch to be turned off, by the control unit; controlling, by the control unit, the third switch, the second switch and the fifth switch to be turned on and the first switch and the fourth switch to be turned off in order to provide a reverse current to the coil, and when it is needed to stop providing the reverse current to the coil, controlling the fifth switch to be turned off and then controlling the third switch and the second switch to be turned off, by the control unit.

Clause 7. The control method according to clause 6, wherein the control unit is further used for controlling the fifth switch to operate based on a pulse width modulation wave; wherein the control method further comprises controlling the fifth switch to operate based on the pulse width modulation wave by the control unit.

Clause 8. The control method according to clause 6 or clause 7, wherein the fifth switch is an electronic switch and a control end of the electronic switch is connected with the control unit.

Clause 9. The control method according to any one of clauses 6-8, wherein the first switch, the second switch, the third switch and the fourth switch are mechanical switches.

Clause 10. The control method according to clause 6, wherein the fifth switch is a mechanical switch.

The invention claimed is:

1. A control circuit of a bistable permanent magnet mechanism, wherein the bistable permanent magnet mechanism comprises a coil, and the control circuit comprises:
a first switch, a second switch, a third switch, a fourth switch, a fifth switch, and a diode, wherein a first end of the first switch, a first end of the third switch, and a negative electrode of the diode are connected with a power supply, wherein a second end of the first switch is connected with a first end of the coil, wherein a second end of the third switch is connected with a second end of the coil, wherein a first end of the second switch is connected with the first end of the coil, wherein a first end of the fourth switch is connected with the second end of the coil, wherein a second end of the second switch, a second end of the fourth switch and, a positive electrode of the diode are connected with a first end of the fifth switch, and wherein a second end of the fifth switch is grounded; and a control unit for controlling turn-on and turn-off of the first switch, the second switch, the third switch, the fourth switch, and the fifth switch, wherein, the control unit controls the first switch, the fourth switch and, the fifth switch to be turned on and the third switch and the second switch to be turned off in order to provide a positive current to the coil, and when the control unit is needed to stop providing the positive current to the coil, the control unit controls the fifth switch to be turned off and then controls the first switch and the fourth switch to be turned off; and the control unit controls the third switch, the second switch and, the fifth switch to be turned on and the first switch and the fourth switch to be turned off in order to provide a reverse current to the coil, and when the control unit is needed to stop providing the reverse current to the coil, the control unit controls the fifth switch to be turned off and then controls the third switch and the second switch to be turned off.

2. The control circuit according to claim 1, wherein the control unit is further used for controlling the fifth switch to operate based on a pulse width modulation wave.

3. The control circuit according to claim 2, wherein the fifth switch is an electronic switch and a control end of the electronic switch is connected with the control unit.

4. The control circuit according to claim 1, wherein the first switch, the second switch, the third switch and, the fourth switch are mechanical switches.

5. The control circuit according to claim 1, wherein the fifth switch is a mechanical switch.

6. A control method for a control circuit of a bistable permanent magnet mechanism, wherein the bistable permanent magnet mechanism comprises a coil, and the control circuit comprises: a first switch, a second switch, a third switch, a fourth switch, a fifth switch, and a diode, wherein a first end of the first switch, a first end of the third switch, and a negative electrode of the diode are connected with a power supply, wherein a second end of the first switch is connected with a first end of the coil, wherein a second end of the third switch is connected with a second end of the coil, wherein a first end of the second switch is connected with the first end of the coil, wherein a first end of the fourth switch is connected with the second end of the coil, wherein a second end of the second switch, a second end of the fourth switch and, a positive electrode of the diode are connected with a first end of the fifth switch, and wherein a second end of the fifth switch is grounded; a control unit for controlling turn-on and turn-off of the first switch, the second switch, the third switch, the fourth switch, and the fifth switch;

the control method comprises:

controlling, by the control unit, the first switch, the fourth switch and, the fifth switch to be turned on and the third switch and the second switch to be turned off in order to provide a positive current to the coil, and when the control unit is needed to stop providing the positive current to the coil, controlling the fifth switch to be turned off and then controlling the first switch and the fourth switch to be turned off, by the control unit; and controlling, by the control unit, the third switch, the second switch and, the fifth switch to be turned on and the first switch and the fourth switch to be turned off in order to provide a reverse current to the coil, and when the control unit is needed to stop providing the reverse current to the coil, controlling the fifth switch to be turned off and then controlling the third switch and the second switch to be turned off, by the control unit.

7. The control method according to claim 6, wherein the control unit is further used for controlling the fifth switch to operate based on a pulse width modulation wave;

wherein the control method further comprises controlling the fifth switch to operate based on the pulse width modulation wave by the control unit.

8. The control method according to claim 7, wherein the fifth switch is an electronic switch and a control end of the electronic switch is connected with the control unit.

9. The control method according to claim 6, wherein the first switch, the second switch, the third switch and the fourth switch are mechanical switches.

10. The control method according to claim 6, wherein the fifth switch is a mechanical switch.

* * * * *